US008522679B2

(12) United States Patent
Zeibig et al.

(10) Patent No.: US 8,522,679 B2
(45) Date of Patent: Sep. 3, 2013

(54) PRESS WITH A TRANSFER DEVICE FOR THE STEPWISE DISPLACEMENT OF THE WORKPIECES AND WITH A GRIPPER RAIL COUPLING

(75) Inventors: Uwe Zeibig, Achem (DE); Klemens Nock, Oberkirch-Zusenhofen (DE)

(73) Assignee: Erdrich Beteiligungs GmbH, Renchen-Ulm (DE)

( * ) Notice: Subject to any disclaimer, the term of this patent is extended or adjusted under 35 U.S.C. 154(b) by 273 days.

(21) Appl. No.: 12/991,769

(22) PCT Filed: Jan. 22, 2009

(86) PCT No.: PCT/EP2009/000364
§ 371 (c)(1),
(2), (4) Date: Jan. 6, 2011

(87) PCT Pub. No.: WO2009/135552
PCT Pub. Date: Nov. 12, 2009

(65) Prior Publication Data
US 2011/0107924 A1  May 12, 2011

(30) Foreign Application Priority Data
May 9, 2008 (DE) .......................... 10 2008 022 994

(51) Int. Cl.
*B30B 15/30* (2006.01)
(52) U.S. Cl.
USPC ...... 100/207; 100/140; 72/405.09; 72/405.12
(58) Field of Classification Search
USPC ................. 100/207, 140; 72/405.09, 405.1, 72/405.12, 405.15
See application file for complete search history.

(56) References Cited

U.S. PATENT DOCUMENTS

| 3,148,571 | A | * | 9/1964 | Wallis | 83/82 |
| 6,910,361 | B2 | * | 6/2005 | Childs et al. | 72/405.11 |
| 7,784,324 | B2 | * | 8/2010 | Dangelmayr | 72/405.13 |
| 2007/0295052 | A1 | * | 12/2007 | Nock et al. | 72/405.16 |

FOREIGN PATENT DOCUMENTS

| DE | 3300227 | 7/1984 |
| DE | 4234997 | 4/1994 |
| EP | 0616859 | 3/1994 |
| EP | 1862237 | 12/2007 |

* cited by examiner

*Primary Examiner* — Dana Ross
*Assistant Examiner* — Chwen-Wei Su
(74) *Attorney, Agent, or Firm* — Volpe and Koenig, P.C.

(57) ABSTRACT

A press with gripper rails for grasping and relocating workpieces onto a work table, the gripper rails being movable in a horizontal plane and vertically by a transfer device. The gripper rails are connected to the respective parts of the transfer device by gripper rail couplings, a locking mechanism with a tie rod being provided, which locks or frees the gripper rail coupling. To actuate the locking mechanism, an actuating element is provided which displaces the tie rod between a holding position and a releasing position and which can be actuated by the gripper rail coupling being lowered or raised. Furthermore, the locking mechanism has a spring element which holds the tie rod in the holding position. Finally, the locking mechanism has a latching mechanism with a detent, which fixes the tie rod in the releasing position and which is freed automatically when the gripper rail coupling is being coupled.

24 Claims, 3 Drawing Sheets

PRESS WITH A TRANSFER DEVICE FOR THE STEPWISE DISPLACEMENT OF THE WORKPIECES AND WITH A GRIPPER RAIL COUPLING

BACKGROUND

The invention relates to a press for the production and forming of workpieces acquiring their final form in a plurality of steps, with a transfer device for the stepwise displacement of the workpieces to individual forming stations of the press, this transfer device having at least one or two gripper rails which are movable back and forth in the advancing direction for the advance and return movement and possess gripper parts or gripper regions for grasping the workpieces, and which can be adjusted for grasping the workpieces and for moving in the advancing direction and subsequently into the initial position again, the transfer device having at least one gripper rail coupling with a coupling piece and with a coupling counterpiece fixedly connected to the gripper rail and designed to fit with the coupling piece, the coupling piece being separable from the coupling counterpiece and connectable to this for the tool change, and the coupling piece having a locking mechanism.

For the tool change on presses, particularly on transfer presses, it is known to release the gripper rail completely or at least in the region of the workpiece holders located on them, so that either a gripper rail piece, together with its drive, or the drive, without gripper rail, can be moved away from this and the gripper rail can be uncoupled and then exchanged.

An arrangement of this type is known from DE 42 34 997 A1, the mutual coupling of a piece of a gripper rail with a remaining piece taking place via a pivotable hook which has to be brought into the position of use, in the region of a bolt to be grasped, by means of a piston drive. In this arrangement, therefore, special controls and drives for actuating this coupling, for example an electric drive or a hydraulic drive, with a corresponding dead weight are required. There is also the need for hydraulic lines and/or cables for electrical actuations, which have to be moved along during each operating stroke of the gripper rails.

SUMMARY

The object, therefore, is to provide a press with a gripper rail coupling of the type initially mentioned, where the gripper rail coupling is to be capable of being actuated without extraneous energy and without special drive means.

To achieve this object, there is provision whereby the locking mechanism has a tie rod which is oriented essentially parallel to the direction of connection of the gripper rail coupling and which can be displaced by a first actuating element between a holding position and a releasing position of the gripper rail coupling, whereby, in the holding position, the tie rod presses at least one locking element into a recess of the coupling counterpiece transversely with respect to the direction of connection of the gripper rail coupling and radially outward, whereby the first actuating element can be actuated mechanically from outside, and whereby an actuation directed transversely with respect to the direction of connection of the gripper rail coupling can be converted into the displacement of the tie rod by the first actuating element. The locking elements pressed into a recess of the coupling counterpiece make, between the coupling piece and the coupling counterpiece, a form fit which allows a play-free connection of the gripper rail coupling.

The invention has the advantage that different operations can be carried out by two movements which run in directions different from one another. On the one hand, when the tie rod of the locking mechanism is in its releasing position, the coupling can be separated or connected by means of a relative movement of the coupling counterpiece in relation to the coupling piece in the direction of connection of the gripper rail coupling. The direction of connection of the gripper rail coupling thus constitutes the operating direction of the gripper rail coupling. On the other hand, by means of a movement transversely with respect to the direction of connection of the two different couplings, that is to say transversely or preferably perpendicularly with respect to this direction, actuation of the actuating element can take place, and therefore the tie rod can be transferred from its holding position to its releasing position, with the result that the locking mechanism ultimately frees the gripper rail coupling. These different movements of the gripper rail coupling can even be carried out by the transfer device and the drive means which drives this, and therefore separate drive means for locking and unlocking the locking mechanism can be dispensed with.

In order to dispense entirely with electric or hydraulic supply lines, the locking mechanism is preferably designed as a mechanically acting device. The tie rod in this case has suitably shaped surfaces, via which the locking element or locking elements can be acted upon with a pressure force. The orientation of the tie rod essentially parallel to the direction of connection has the effect that the structural dimension of the gripper rail coupling transversely to this direction of connection is especially small. The amount of material used for forming the coupling piece and the coupling counterpiece is therefore especially low, with the result that the mass move along with the transfer device is as low as possible. Preferably, the deviation in the orientation of the tie rod from the direction of connection amounts to less than 5 degrees.

It is especially beneficial if, in order to actuate the first actuating element, a movement of the gripper rail, with its gripper rail coupling, in relation to a bearing bracket or a tool table and transversely with respect to the extent of the gripper rail is provided, and if the first actuating element can be acted upon by this movement of the gripper rail. By the actuating element being configured in such a way that its actuation can take place from outside in a direction which is oriented transversely, that is to say crosswise or even perpendicularly, to the extent of the gripper rail, a depositing movement of the gripper rail can be combined with the movement causing the actuation of the actuating element. In this case, preferably, the bearing bracket or tool table, on which the gripper rail is to be deposited, affords the fixed point against the actuating element is pressed by the transfer device, with the result that it can be acted upon with the mechanical pressure necessary for displacing the tie rod.

In a refinement of the invention, there may be provision whereby the tie rod is held in the holding position by a restoring force or spring, and whereby the tie rod can be drawn back into the releasing position in relation to the coupling piece by the first actuating element, counter to the restoring force or the force of the spring, in order to release the coupling. What is thereby achieved is that the tie rod returns to the holding position automatically when the above-described action upon the actuating element ceases, that is to say, for example, when the movement carried out in order to actuate the actuating element is reversed. A back and forth movement of the tie rod can thus be executed by the drive of the transfer unit, without the actuating element having to be subjected to tensile load at its free end.

In a further refinement of the invention, there may be provision whereby the bearing bracket or tool table has formed on it a guide element which guides the coupling counterpiece, with the gripper rail, displaceably along or parallel to the direction of actuation of the first actuating element in a reception region. This reception region comprises, in particular, that position of the gripper rail in relation to the bearing bracket or tool table which forms the starting point for the actuation of the first actuating element. The guide element thus assists the movement, carried out by the drive means of the transfer device, of the gripper rail and of the gripper rail coupling for the actuation of the actuating element. In this reception region, the guide element, by guidance, fixes the gripper rail against displacement along the direction of connection of the gripper rail coupling. Thus, when the locking mechanism is freed by the tie rod being drawn back, the coupling piece can be released from the coupling counterpiece, in that the transfer device draws the coupling piece back by means of a movement running in the direction of connection of the gripper rail coupling. The guide element in this case retains the coupling counterpiece, which is fixedly connected to the gripper rail.

It is especially beneficial if, in order to actuate the actuating element, the bearing bracket or tool table has a release projection, if the release projection comes into operative connection with the first actuating element as a result of a lowering of the gripper rail, with its gripper rail coupling, and if, as a result of the further lowering movement, the tie rod can be transferred into its releasing position via the first actuating element for the purpose of releasing the coupling. The release projection is preferably designed as a boss or nose and/or is designed identically to the guide element. Thus, the coupling is automatically released at the same time by the gripper rail being lowered on a bearing bracket or tool table, as is necessary in any case during the tool change, with the result that the transfer device can separate the coupling piece, receiving or carrying the gripper rail during use, from the coupling counterpiece, after the gripper rail, together with the coupling counterpiece, has been deposited on the bearing bracket or tool table. The actuation of the gripper rail coupling can thus be carried out by movement sequences which can be executed in any case by the drive of the transfer device, and therefore this drive does not require any additional development. Thus, in particular, an already existing press with transfer device can be upgraded and operated with the gripper rail coupling according to the invention.

In one embodiment of the invention, there may be provision whereby the first actuating element provided is a gearwheel or toothed quadrant with a pivoting arm, which pivoting arm can be pivoted by means of the release projection, with the result that the gearwheel or toothed quadrant can be rotated, and whereby the tie rod or a part connected to it has a rack which meshes with the gearwheel or toothed quadrant, so that the tie rod can be drawn back as a result of the pivoting of the pivoting arm via the toothing. The gearwheel or toothed quadrant having the pivoting arm is in this case mounted rotatably on the coupling piece, and the loose end of the pivoting arm affords the engagement surface for the release projection. The toothing part, which meshes with the rack, serves for converting the actuating movement of the actuating element into the displacement movement of the tie rod.

In an alternative refinement, there may be provision whereby the first actuating element provided is a second rack, which meshes with a gearwheel or toothed quadrant which meshes with a toothing of the tie rod, and whereby this actuating rack can be adjusted transversely or at right angles to the tie rod.

It is especially beneficial if, for the engagement of the gearwheel on the actuating rack, on the one hand, and on the rack of the tie rod, on the other hand, the gearwheel or toothed segment is designed as a toothed roller. Sufficient freedom of movement for the racks crossing one another is thus afforded.

In an alternative refinement, for converting the actuating movement of the actuating element into the displacement movement of the tie rod, there may be provision whereby the first actuating element is a tappet with an oblique face which engages on a counterface connected to the tie rod. This counterface may be formed, for example, by a rounded end of the tie rod. Preferably, the oblique face of the tappet and the counterface engaging on the tie rod are oblique faces bearing one against the other over their area. This gives rise to especially low material wear during the frequent actuation of the actuating element.

Manual actuation, assisting automated actuation, for example in the event of maintenance, of the locking mechanism can be carried out, for example, when, as first actuating element or as additional actuating element, a tool engagement place arranged on the gearwheel is provided, for example a polygon or a hollow polygon, and also a tool fitting with this.

Essentially force-free separation of the gripper rail coupling can be carried out when, after the tie rod has been drawn back, the locking element or locking elements is or are released, and the coupling piece can thereby be drawn back into an uncoupled position with respect to the coupling counterpiece along the direction of connection of the gripper rail coupling.

In one refinement of the invention, there may be provision whereby, in order to fix the tie rod in the releasing position counter to the restoring force or spring acting on this, a latching mechanism with a detent is provided, which is out of engagement in the holding position of the tie rod and which detains in the uncoupled position of the gripper rail coupling. Preferably, this detent latches as soon as the tie rod is displaced into its releasing position. Action upon the actuating element can therefore cease as soon as the tie rod is transferred into the releasing position. Thus, in particular, the coupling piece can be removed from the bearing bracket or tool table, without the tie rod pressing the locking elements into the position preventing connection to the coupling counterpiece or to another coupling counterpiece. The transfer device can thus transport the coupling piece released from the coupling counterpiece to another position, for example to another bearing bracket or another tool table and can connect it there to another gripper rail or another tool.

To activate the tie rod, there may be provision whereby the detent can be actuated mechanically by a second actuating element, and whereby the second actuating element converts an actuation acting from outside and directed essentially parallel to the direction of connection of the gripper rail coupling into an actuation of the detent. The movement required for connecting the coupling piece to a coupling counterpiece can thereby be utilized for actuating the detent so as to free the tie rod. Thus, during the operation of the gripper rail coupling, the tie rod can go into its holding position and thereby act upon the locking elements, with the result that the gripper rail coupling is secured against release.

An automatic drop-in of the detent, as soon as the tie rod has reached its releasing position, can be achieved in that the second actuating element has a pivotably mounted lever arm, in that the detent can be adjusted transversely with respect to the tie rod by means of the pivoting movement of the lever arm, and whereby the tie rod has a clearance which is arranged in the region of the detent after the tie rod has been drawn back, so that the detent engages into the clearance by means of a spring force as a result of the pivoting of the lever arm and comes into the detaining position.

To release the detent on the gripper rail or on the coupling counterpiece connected to the latter, a second release projection may be arranged, which engages under the lever arm carrying the detent, during the closing of the coupling, pivots said lever arm and thereby disengages the detent. The tie rod is thus freed as soon as the coupling piece carrying the lever arm is assembled together with the coupling counterpiece. The tie rod can thereby come into its holding position again, act upon the locking element or locking elements and thus fix the gripper rail coupling. The tie rod displacement necessary for this purpose takes place preferably by spring force. The release projection is preferably designed as a boss. Especially beneficial conditions arise when the lever arm acting upon the detent and/or the second release projection are/is sloped and/or rounded at the locations and faces touching one another. As a result, during the operation of the gripper rail coupling, the displacement of the lever arm by the release projection is converted into a detent displacement freeing the tie rod.

Especially beneficial conditions arise when the lever arm acting upon the detent acts, on one side of its pivot mounting, upon the detent and cooperates with the release projection, and/or when a compression spring engages on the detent-actuating lever arm on the other side of its pivot mounting and brings the lever arm and, with this, the detent into the position of use, that is to say into the position fixing the tie rod, after the coupling piece has been drawn back out of its coupling position and away from the second release projection.

A material-saving version is obtained when the guide element is designed as a pin which engages into a correspondingly designed recess in the sliding rail or in the coupling counterpiece.

In one refinement, there may be provision whereby the coupling piece has a recess on its underside, whereby the first actuating element projects partially out of this recess, and whereby this recess is open in the direction of connection of the gripper rail coupling. Thus, on the one hand, the actuating element is protected by the recess-surrounding boundary against unintentional actuation and, on the other hand, the coupling piece can be removed from the coupling counterpiece while the release projection acts upon the actuating element and thus holds the tie rod in its releasing position.

An especially beneficial functioning of the locking mechanism is obtained if the at least one locking element is designed as a ball, and if the recess, receiving the locking element, of the coupling counterpiece is a spherical sleeve. Preferably, a ball acting as a locking element is provided, which is pressed radially outward by the tie rod in the holding position and thus fixes the gripper rail coupling. However, developments have a ring of such balls.

Automatic centering during the connection of the gripper rail coupling is brought about, for example, if the coupling piece has a portion of cone-like shape and the coupling counterpiece has a reception region of correspondingly cone-like shape, and if the coupling locking is arranged concentrically with respect to the cone-like portion of the coupling piece. The coupling piece is thus plugged into the coupling counterpiece, and the inner space of the coupling piece can be used for receiving the locking mechanism. This gives rise to an especially short dimensioning of the gripper rail coupling.

In one refinement of the invention, there may be provision whereby the direction of connection of the gripper rail coupling is oriented transversely with respect to the extent of the gripper rail. A plurality of reception points for the transfer device can thus be provided on the gripper rail and are equipped in each case with a gripper rail coupling according to the invention, these gripper rail couplings being actuable simultaneously by means of one common operation.

BRIEF DESCRIPTION OF THE DRAWINGS

Exemplary embodiments of the invention are described in more detail below with reference to the drawings in which.

DETAILED DESCRIPTION OF THE PREFERRED EMBODIMENTS

Figure 1:
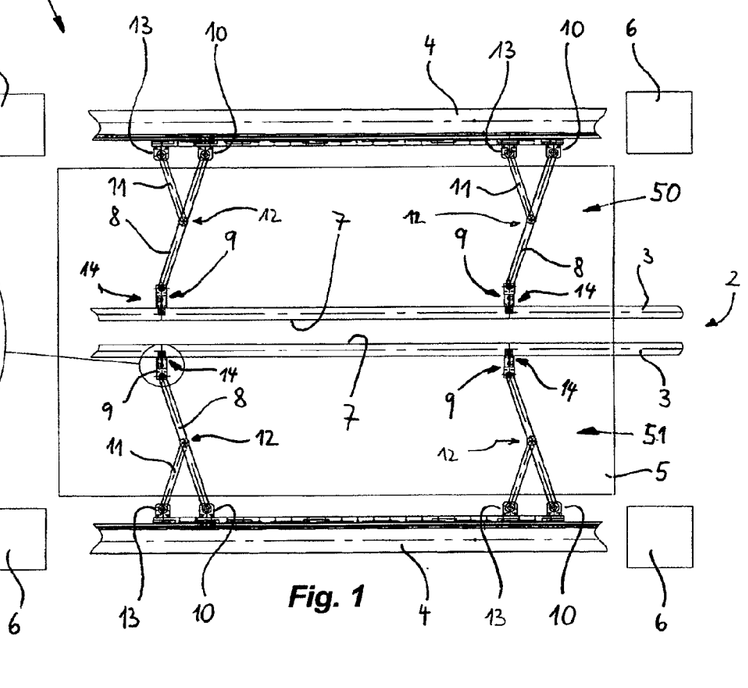
FIG. 1 shows a transfer device according to the invention on a press, from above.
Figure 2:
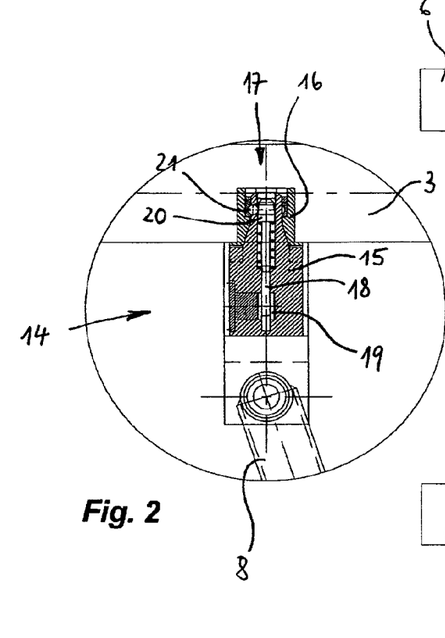
FIG. 2 shows a view of a detail of a press according to FIG. 1 with a sectional illustration of a gripper rail coupling.

FIG. 1 shows a press, designated in general by 1, for the production or forming of workpieces in a basic illustration from above. The press 1 has a transfer device 2 with a first part 50 which carries a gripper rail 3 and which is fastened to a crosshead 4. A second part 51 of the transfer device 2 with a second gripper rail 3 is designed mirror-symmetrically to the first part 50 of the transfer device 2 with the first gripper rail 3 and is fastened to a second crosshead 4. The gripper rails 3 thus form a pair of gripper rails, by which workpieces, not illustrated, placed on the work table 5 can be grasped, displaced or relocated, as is known, for example, from DE 10 2004 023 525 A1.

Furthermore, the press 1 has a press tool, not illustrated in any more detail, which is supported on pillars 6 and which is arranged above the work table 5. This press tool can be moved toward the work table, with the result that it is guided into touch contact with the workpieces and works these in a configuring manner. The gripper rails 3 thus form gripping tools, on which are formed gripper regions 7 by which the workpieces can be grasped.

In order to transport the workpieces to the various forming stations provided on the work table 5, the transfer device 2 is designed to be movable and can move the gripper rails 3 in the region of the work table 5. For this purpose, each part 50, 51 of the transfer device 2 has in each case a pair of levers 8 which are connected in an articulated manner at one end to an extension 9 connected to the gripper rail 3 and, at their other end, to a displacement element 10. Approximately in the middle of the lever 8, a pivoting arm 11 is articulated at an articulation point 12 and is connected at its free end in an articulated manner to a second displacement element 13. The displacement elements 10 and 13 are mounted on the crosshead 4 in such a way that they are displaceable along the direction of extent of the crosshead 4. The displacement elements 10, 13 are displaced, for example, by a spindle drive, not shown in any more detail, or by operating cylinders. If the displacement elements 10 are moved synchronously with the displacement elements 13, this gives rise to a movement of the gripper rails 3 in their direction of extent. If, however, the displacement elements 13 are moved synchronously with one another, but contradirectionally to the displacement elements 10, this results in a movement of the gripper rails over the work table 5 transversely with respect to the direction of extent of the gripper rails 3. Thus, by appropriate synchronization of the movement of the displacement elements 10, 13, advance and return movements for the stepwise displacement of the workpieces to individual forming stations on the work table can be carried out.

During operation, the gripper rails 3 are fastened to the respective part 50, 51 of the transfer device 2 fixedly, but releasably via a gripper rail coupling 14, not illustrated in any more detail in FIGS. 2 to 8. This gripper rail coupling 14 has a coupling piece 15 which is fastened in a sleeve-shaped recess of the extension 9. A coupling counterpiece 16 fitting with this coupling piece is arranged in a recess on the gripper rail 3. In the coupled position, the coupling piece 15 engages partially into a matching recess of the coupling counterpiece 16.

In order to lock the gripper rail coupling 14 in the coupled position, a locking mechanism 17 is arranged inside the coupling piece 15. This locking mechanism 17 has a tie rod 18 which is oriented essentially parallel to the direction of connection of the gripper rail coupling 14. The tie rod 18 can be displaced along its axis by an actuating element 19 between a holding position and a releasing position. A conical tip 20 is formed at that end of the tie rod 18 which is remote from the actuating element 19 and, in the holding position of the tie rod 18, presses balls 21, acting as locking elements, radially outward into a recess designed as a continuous groove 22 in a spherical sleeve 23. In the coupled position, that is to say when the coupling piece 15 is plugged into the coupling counterpiece 16, the gripper rail coupling 14 is secured by a form fit against a release of the connection, as soon as the tie rod 18 is in the holding position.

Figure 3:
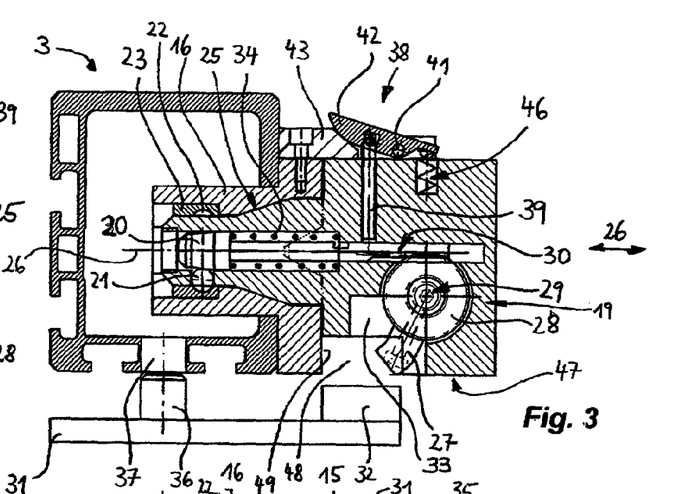
FIG. 3 shows a lateral sectional illustration of the gripper rail coupling according to FIG. 2 in the uncoupled position.
Figure 4:
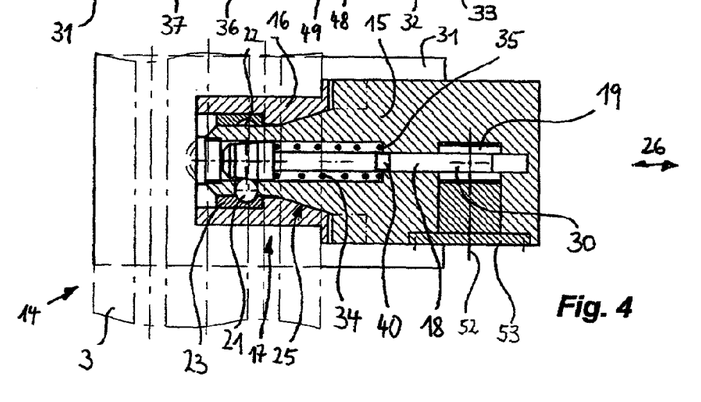
FIG. 4 shows a sectional illustration of the gripper rail coupling according to FIG. 3, from above.
Figure 5:
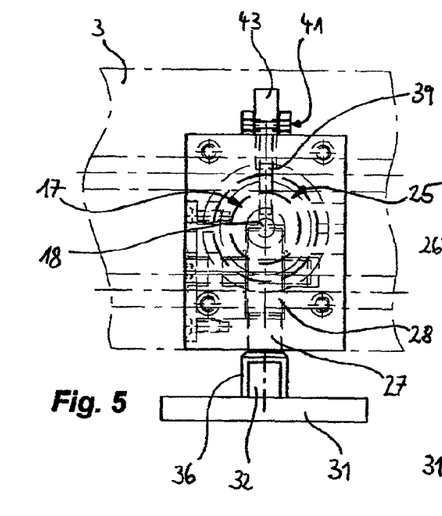
FIG. 5 shows a view of the gripper rail coupling according to FIG. 3 along the direction of connection of the gripper rail coupling.

FIGS. 3 to 5 show the gripper rail 3 which is formed as a hollow continuously cast profile, and into which the coupling counterpiece 16 is plugged. The coupling counterpiece 16 has a continuous recess 24 in which is formed a conical portion 25 which receives a conical outer face, formed so as to fit with this, of the coupling piece 15, for the play-free fastening of the coupling piece 15 to the gripper rail 3. Inside the coupling piece 15, a tie rod 18 is arranged in a stepped bore and can be displaced in the direction of connection 26 of the gripper rail coupling 14 by an actuating element 19. The actuating element 19 has a pivoting arm 27 which can be actuated mechanically, in particular by the action of pressure, from outside, this actuation being directed transversely to the direction of connection 26 of the gripper rail coupling 14. Furthermore, the actuating element 19 has a gearwheel 28 which is mounted rotatably about its pinion shaft 52 in a mounting 29 and which is connected fixedly to the pivoting arm 27. The gearwheel 28 is covered outwardly by a cover 53. The toothing of the gearwheel 28 meshes with a toothing of a rack 30 formed on the tie rod 18. The tie rod 18 can thus be displaced by the actuation, in particular pivoting, of the pivoting arm 27, the actuating movement being converted into the displacement of the tie rod by the gearwheel 28.

FIGS. 3 to 5 show in this case the gripper rail coupling 14 in the coupled position, the entire arrangement of the gripper rail 3, with the gripper rail coupling 14, being positioned above a bearing bracket 31. If, then, the arrangement of the gripper rail 3, with the gripper rail coupling 14, is moved towards the bearing bracket 13 transversely with respect to the direction of extent of the gripper rail 3, which stands vertically on the drawing plane in FIG. 3, a release projection 32 formed on the bearing bracket 31 comes into contact with the free end of the pivoting arm 27 and pivots the latter into a correspondingly formed receptacle 33 of the coupling piece 15. This brings about a rotational movement of the gearwheel 28 and, further, a displacement of the tie rod 18 to the right, with the result that the tip 20 of the tie rod 18 comes out of the region of the balls 21. The locking mechanism 17 is thereby released.

The tie rod 18, illustrated in its holding position in FIGS. 3 and 4, is held in this holding position by a spring 34. As a result of the described movement of the gripper rail 3 toward the bearing bracket 31, in the course of which the angled pivoting arm 27 of the actuating element 19 is acted upon and pivoted, the tie rod 18 is drawn back, counter to the restoring force of this spring 34 tension-mounted between the tip 20 and a stop 35, into the releasing position arranged further to the right.

Furthermore, the bearing bracket 31 has formed on it a centering bolt 36 which acts as a guide element and which has at its end a slope or chamfer serving as a centering aid and is introduced into a bore 37 of the sliding rail 3 before the release projection 32 comes into contact with the pivoting arm 27. Thus, during the movement toward the bearing bracket 31, the gripper rail 3 with the gripper rail coupling 14 is guided in a segment of movement when the gripper rail 3 with the gripper rail coupling 14 comes into the reception region for the bearing bracket 31.

As already described, the release projection 32 comes into operative connection with the actuating element 19 as a result of a lowering of the gripper rail 3 with its gripper rail coupling 14, and as a consequence of this a further lowering movement causes the tie rod 18 to be transferred into its releasing position via the actuating element 19. The locking mechanism 17 is thus freed, and the gripper rail coupling 14 can be released. The coupling piece 15 can therefore be separated from the coupling counterpiece 16 without appreciable effort, the coupling counterpiece 16 with the gripper rail 3 being retained on the bearing bracket 31 by the centering bolt 36.

Figure 6:
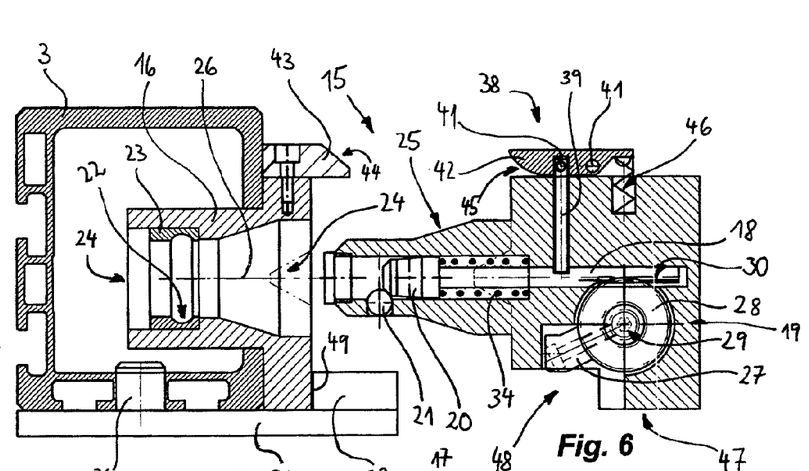
FIG. 6 shows a side view in a sectional illustration of the gripper rail coupling according to FIG. 2 in the coupled position.
Figure 7:
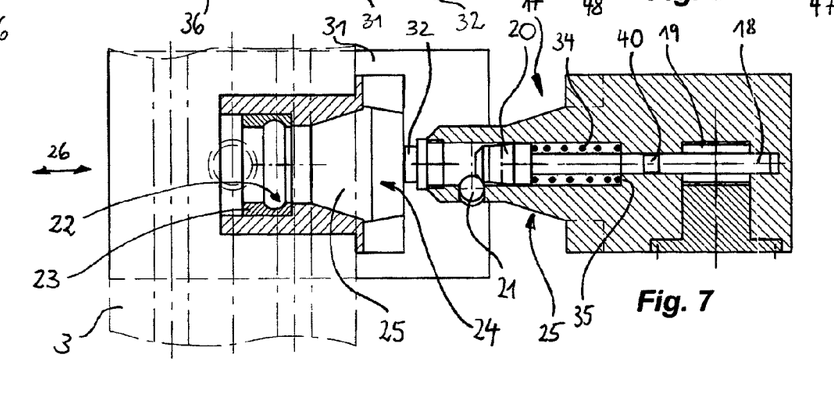
FIG. 7 shows a sectional illustration of the gripper rail coupling according to FIG. 6, from above.
Figure 8:
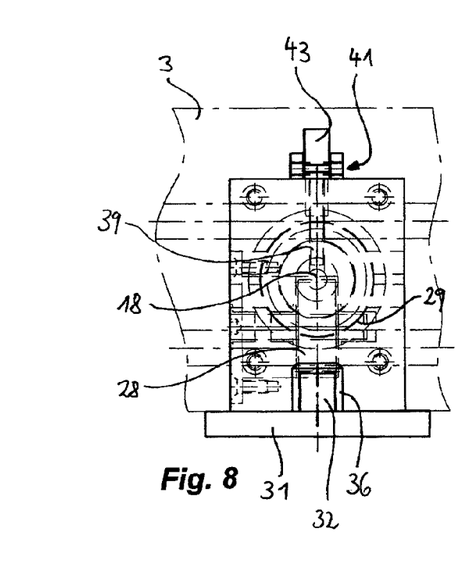
FIG. 8 shows a view of the gripper rail coupling according to FIG. 6, looking along the direction of connection of the gripper rail coupling.

The situation arising from this is illustrated in FIGS. 6 to 8. The coupling piece 15, then, is drawn out of the coupling counterpiece 16 as a result of displacement along the direction of connection 26 of the gripper rail coupling 14. This drawing out was possible because, by the gripper rail coupling 14 being lowered and by the release projection 21 cooperating with the actuating element 19, the tie rod 18 was displaced into the releasing position illustrated in FIG. 6, with the result that the balls 21 acting as locking elements were freed.

In another exemplary embodiment, the conversion of the lowering movement of the gripper rail coupling 14 into a displacement movement of the tie rod 18 is brought about by a combination of a rack which runs perpendicularly with respect to the tie rod 18 in FIG. 6 and in the drawing plane and which meshes with a toothing element provided in FIG. 6 instead of the gearwheel 28, this toothing element actuating a rack 30 of the tie rod 18, as shown in FIG. 6. In this exemplary embodiment, the toothing part is designed as a wide toothed roller, as a result of which the racks then provided, crossing one another in their active direction, can be guided past one another and can nevertheless mesh simultaneously with the toothed part. In this exemplary embodiment, the pivoting arm 27 shown in FIG. 6 can be dispensed with. The additional rack is likewise actuated by a release projection 21 during the lowering of the gripper rails 14.

A further exemplary embodiment differs from the exemplary embodiment according to FIGS. 3 to 8 only in the configuration of the actuating element 19. To explain this exemplary embodiment, not illustrated in any more detail, reference is therefore made to FIGS. 3 to 8, and only the deviation from these figures is described. Instead of the toothing parts 28, 30, a tappet with an oblique face is formed as an actuating element and can likewise be displaced in the drawing plane in FIG. 6 and perpendicularly with respect to the tie rod 18, this oblique face acting upon and displacing the tie rod 18. For this purpose, the tie rod 18 has a correspondingly obliquely designed counterface which is formed at its end and which lies on this oblique face and is arranged such that actuation of the tappet during lowering forces the tie rod 18 to be drawn back into the releasing position.

Additionally or alternatively to the pivoting arm 27, the gearwheel 28 in FIGS. 3 and 6 has in the pinion shaft 53 a tool engagement place in the form of a polygon, into which a correspondingly fitting tool can be introduced for manual actuation of the actuating element 19 in FIGS. 3 to 8.

As already described, by the tie rod 18 being drawn back into the releasing position, the locking mechanism 17 is released, with the result that the coupling piece 15 can be drawn back into an uncoupled position, as illustrated in FIG. 6, with respect to the coupling counterpiece 16 in the direction of connection 26 of the gripper rail coupling 14. As soon as the tie rod 18 is transferred into the releasing position by the actuating element 19, a detent 39 provided on a latching mechanism 38 comes into engagement with a clearance 40 formed on the tie rod 18, with the result that the tie rod 18 is fixed in the releasing position counter to the spring force of the spring 34. The spring 34 therefore cannot relax and the tie rod 18 cannot be transferred into the holding position. The coupling piece 15 can therefore be plugged freely into the recess of the coupling counterpiece 16 and removed from this.

The latching mechanism 38 has a lever arm 42 which is mounted about the center of rotation 41 on the coupling piece 15 and on which the detent 39 is articulated. The detent is thus adjusted by means of a pivoting movement of the lever arm 42 transversely with respect to the tie rod 18 and frees the tie rod 18 again. A release projection 43 is fastened to the coupling counterpiece 16 and engages under the lever arm 42 as soon as the coupling piece 15 is introduced into the coupling counterpiece 16. By the release projection 43 engaging underneath in this way, the lever arm 42 is pivoted upward in FIG. 6, with the result that the detent 39 comes out of engagement, the tie rod 18 is freed, and the spring 34 relaxes and transfers the tie rod 18 into the holding position. To achieve better functionality, the release projection 43 has a slope 44 which is designed to fit with a corresponding rounding 45 on the lever arm 42. While the articulation point of the detent 39 and the engagement point of the release projection 43 are arranged on one side of the center of rotation 41 serving as pivot mounting, a compression spring 46 is arranged on the other side of this pivot mounting and presses the lever arm 42 and therefore the detent 39 into the clearance 40, that is to say brings them into the position of use, as soon as the tie rod 18 has come into the releasing position.

As shown in FIG. 3, the coupling piece 15 has on its underside 47 a recess 48, out of which the free end of the pivoting arm 27 projects in order to come into operative contact with the release projection 32. However, in this case, the free end of the pivoting arm 27 does not project beyond the boundary face of the underside 47, so that the gripper rail 3 with the gripper rail coupling 14 can be deposited on a base which has no release projection 32, without the actuating element 19 being actuated. As is clear in FIG. 6, the recess 48 provided for receiving the release projection 32 is designed to be open in the direction of connection of the gripper rail coupling 14. The coupling piece 15 can therefore be drawn off from the release projection 32 introduced into the recess 48, without parts of the coupling piece 15 or other parts obstructing this draw-off. That side face of the release projection 32 which points toward the coupling counterpiece bears in this case against a bearing face 49 of the coupling counterpiece 16 and retains the latter when the coupling piece 15 is being drawn back.

As is clear from FIGS. 5 and 8, the locking mechanism 17 with the tie rod 18 is arranged concentrically to the cone-like portions 25 of the coupling counterpiece 16 or of the coupling piece 15.

Each of the four extensions 9 in FIG. 1 has a gripper rail coupling 14 described, the direction of connection 26 of the gripper rail coupling 14 being in each case oriented transversely with respect to the extent of the gripper rails 3 and running in the drawing plane. The actuation of the locking mechanism 17, that is to say the lowering of the gripper rail coupling 14, takes place by the lowering of the transfer device 2, together with the crossheads 4.

The invention relates to a transfer device 2 particularly for a press 1 with gripper rails 3 for grasping and relocating workpieces onto a work table 5, the gripper rails 3 being movable by the transfer device 2 in a horizontal plane and vertically. The gripper rails 3 are connected to the respective parts 50, 51 of the transfer device 2 by gripper rail couplings 14, a locking mechanism 17 with a tie rod 18 being provided which locks or frees the gripper rail coupling 14. To actuate the locking mechanism 17, an actuating element 19 is provided, which displaces the tie rod 18 between a holding position and a releasing position and which can be actuated by the gripper rail coupling 14 being lowered or raised. Furthermore, the locking mechanism 17 has a spring element 34 which holds the tie rod 18 in the holding position. Finally, the locking mechanism 17 has a latching mechanism 38 with a detent 39 which fixes the tie rod 18 in the releasing position and which is freed automatically when the gripper rail coupling 14 is being coupled.

The invention claimed is:

1. A press for the production or forming of workpieces that acquire their final form in a plurality of steps, comprising a transfer device (2) for stepwise displacement of the workpieces to individual forming stations of the press, the transfer device (2) having at least one gripper rail (3) which is movable back and forth in an advancing direction for the advance and return movement and includes gripper parts or gripper regions (7) for grasping the workpieces, and which can be adjusted for grasping the workpieces and for moving in the advancing direction and subsequently into an initial position again, the transfer device (2) having at least one gripper rail coupling (14) with a coupling piece (15) and with a coupling counterpiece (16) fixedly connected to the gripper rail (3) and designed to fit with the coupling piece (15), the coupling piece (15) being separable from the coupling counterpiece (16) and connectable thereto for a tool change, and the coupling piece (15) having a locking mechanism (17), the locking mechanism (17) has a tie rod (18) which is oriented essentially parallel to a direction of connection (26) of the gripper rail coupling (14) and which can be displaced by a first actuating element (19) between a holding position and a releasing position of the gripper rail coupling (14), and in the holding position, the tie rod (18) presses at least one locking element (21) into a recess (22) of the coupling counterpiece (16) transversely with respect to the direction of connection (26) of the gripper rail coupling (14) and radially outward, the first actuating element (19) can be actuated mechanically from outside, and an actuation directed transversely with respect to the direction of connection (26) of the gripper rail coupling (14) can be converted into a displacement of the tie rod (18) by the first actuating element (19).

2. The press as claimed in claim 1, wherein in order to actuate the first actuating element (19), a movement of the gripper rail (3), with the gripper rail coupling (14), in relation to a bearing bracket (31) or a tool table (5) transversely with respect to an extent of the gripper rail (3) is provided, and the first actuating element (19) can be acted upon by this movement of the gripper rail (3).

3. The press as claimed in claim 1, wherein the tie rod (18) is held in the holding position by a restoring force or spring (34), and the tie rod (18) can be drawn back into the releasing position in relation to the coupling piece (15) by the first actuating element (19), counter to the restoring force or the force of the spring (34), in order to release the gripper rail coupling (14).

4. The press as claimed in claim 2, wherein the bearing bracket (31) or tool table (5) has formed thereon a guide element (32, 36) which guides the coupling counterpiece (16), with the gripper rail (3), displaceably along or parallel to the direction of actuation of the first actuating element (19) in a reception region and which fixes said coupling counterpiece in the reception region against displacement along the direction of connection (26) of the gripper rail coupling (14).

5. The press as claimed in claim 4, wherein the guide element (36) is designed as a pin which engages into a correspondingly designed recess (37) in the sliding rail (3) or in the coupling counterpiece (16).

6. The press as claimed in claim 2, wherein the bearing bracket (31) or tool table (5) has a release projection (32), the release projection (32) comes into operative connection with the first actuating element (19) as a result of a lowering of the gripper rail (3), with the gripper rail coupling (14), and as a result of a further lowering movement, the tie rod (18) can be transferred into the releasing position via the first actuating element (19) for releasing the gripper rail coupling (14).

7. The press as claimed in claim 6, wherein the first actuating element (19) provided is a gearwheel (28) or toothed quadrant with a pivoting arm (27), which pivoting arm (27) can be pivoted by the release projection (32), with the result that the gearwheel (28) or toothed quadrant can be rotated, and the tie rod (18) or a part connected to it has a rack (30) which meshes with the gearwheel (28) or toothed quadrant, so that the tie rod (18) can be drawn back as a result of the pivoting of the pivoting arm (27) via toothing of the gearwheel (28) or toothed quadrant.

8. The press as claimed in claim 6, wherein the first actuating element (19) provided is a second rack, which meshes with a gearwheel (28) or toothed quadrant which meshes with a toothing of the tie rod (18), and the second rack can be adjusted transversely or at right angles to the tie rod (18), so that the tie rod (18) can be drawn back as a result of the displacement of the second rack via toothing of the gearwheel (28) or toothed quadrant.

9. The press as claimed in claim 8, wherein for the engagement of the gearwheel (28) on the second rack and on the toothing of the tie rod (18), the gearwheel (28) or toothed quadrant is designed as a toothed roller.

10. The press as claimed in claim 1, wherein the first actuating element (19) is a tappet with an oblique face which engages on a counterface connected to the tie rod (18), so that the tie rod (18) can be drawn back as a result of a displacement of the tappet.

11. The press as claimed in claim 10, wherein the oblique face of the tappet and the counterface engaging on the tie rod (18) are oblique faces bearing one against the other over their area.

12. The press as claimed in claim 1, wherein as the first actuating element (19) or as an additional actuating element, a tool engagement place arranged on the gearwheel (28) and also a tool fitting with the tool engagement place are provided.

13. The press as claimed in claim 1, wherein after the tie rod (18) has been drawn back, the locking element or locking elements (21) is or are released, and the coupling piece (15) can thereby be drawn back into an uncoupled position with respect to the coupling counterpiece (16) along the direction of connection (26) of the gripper rail coupling (14).

14. The press as claimed in claim 3, wherein in order to fix the tie rod (18) in the releasing position counter to the restoring force or spring (34) acting thereon, a latching mechanism (38) with a detent (39) is provided, which is out of engagement in the holding position of the tie rod (18) and which detains in an uncoupled position of the gripper rail coupling (14).

15. The press as claimed in claim 14, wherein the detent (39) can be actuated mechanically by a second actuating element (42), and the second actuating element (42) converts an actuation acting from outside and directed essentially parallel to the direction of connection (26) of the gripper rail coupling (14) into an actuation of the detent (39).

16. The press as claimed in claim 15, wherein the second actuating element (42) has a pivotably mounted lever arm (42), the detent (39) can be adjusted transversely with respect to the tie rod (18) by a pivoting movement of the lever arm (42), and the tie rod (18) has a clearance (40) which is arranged in a region of the detent (39) after the tie rod (18) has been drawn back, so that the detent (39) engages into the clearance (40) by a spring force (46) as a result of the pivoting of the lever arm (42) and comes into a detaining position.

17. The press as claimed in claim 16, wherein to release the detent (39) on the gripper rail (3) or on the coupling counterpiece (16) connected to the latter, a second release projection (43) is arranged, which engages under the lever arm (42) carrying the detent (39), during the closing of the gripper rail coupling (14), pivots said lever arm and thereby disengages the detent (39).

18. The press as claimed in claim 17, wherein at least one of the lever arm (42) actuating the detent (39) or the second release projection (43) are/is sloped or rounded at locations and faces (44, 45) touching one another.

19. The press as claimed in claim 17, wherein the lever arm (42) actuating the detent (39) acts, on one side of a pivot mounting (41) therefor, upon the detent (39) and cooperates with the second release projection (43).

20. The press as claimed in claim 19, wherein a compression spring (46) engages on the detent (39)—actuating lever arm (42) on the other side of the pivot mounting (41), and brings the lever arm (42) and the detent (39) into a position of use after the coupling piece (15) has been drawn back out of the coupling position and away from the second release projection (43).

21. The press as claimed in claim 20, wherein the coupling piece (15) has a recess (48) on an underside (47) thereof, the first actuating element (19) projects partially out of the recess (48), and the recess (48) is open in the direction of connection (26) of the gripper rail coupling (14).

22. The press as claimed in claim 1, wherein the at least one locking element (21) is designed as a ball, and the recess (22), receiving the locking element (21), of the coupling counterpiece (16) is a spherical sleeve (23).

23. The press as claimed in claim 1, wherein the coupling piece (15) has a conical portion (25) and the coupling counterpiece (16) has a correspondingly conical reception region, and the locking mechanism (17) is arranged concentrically with respect to a cone-like portion (25) of the coupling piece (15).

24. The press as claimed in claim 1, wherein the direction of connection (26) of the gripper rail coupling (14) is oriented transversely with respect to an extent of the gripper rail (3).

* * * * *